United States Patent
Gottardo et al.

(10) Patent No.: US 7,057,105 B2
(45) Date of Patent: Jun. 6, 2006

(54) ELECTRICAL DISTRIBUTION BOX

(75) Inventors: Daniel Gottardo, Merishausen (CH); Daniel Sigg, Merishausen (CH); Martina Bruland, Dörentrup (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 0 days.

(21) Appl. No.: 11/059,388

(22) Filed: Feb. 17, 2005

(65) Prior Publication Data

US 2005/0183873 A1 Aug. 25, 2005

(30) Foreign Application Priority Data

Feb. 24, 2004 (DE) .................. 20 2004 002 624 U

(51) Int. Cl.
    *H02G 3/08* (2006.01)
(52) U.S. Cl. .................... 174/50; 174/48; 174/53; 220/3.2; 220/3.3; 439/535
(58) Field of Classification Search .............. 174/50, 174/53, 57, 58, 48, 49, 66, 67; 220/3.2, 3.3, 220/3.4, 3.5, 3.7, 3.8, 4.02; 248/906; 439/535, 439/536; 277/647, 910; 709/250
See application file for complete search history.

(56) References Cited

U.S. PATENT DOCUMENTS

| | | | | |
|---|---|---|---|---|
| 4,298,204 A | * | 11/1981 | Jinkins | 277/641 |
| 4,721,476 A | * | 1/1988 | Zeliff et al. | 174/48 |
| 4,758,687 A | * | 7/1988 | Lathrop | 174/53 |
| 4,967,041 A | * | 10/1990 | Bowman | 174/48 |
| 4,988,832 A | * | 1/1991 | Shotey | 174/53 |
| 5,257,946 A | * | 11/1993 | MacMillan et al. | 174/53 |
| 5,349,134 A | * | 9/1994 | Russell | 174/48 |
| 5,710,392 A | * | 1/1998 | Bordwell et al. | 174/50 |
| 6,362,421 B1 | * | 3/2002 | Layton, Jr. | 174/50 |
| 6,369,321 B1 | | 4/2002 | Flegel | |
| 6,519,208 B1 | * | 2/2003 | DeVries | 174/50 |
| 6,880,020 B1 | * | 4/2005 | Rubinstein et al. | 709/250 |

FOREIGN PATENT DOCUMENTS

| | | |
|---|---|---|
| DE | 42 40 727 C1 | 2/1994 |
| DE | 295 17 876 U1 | 2/1996 |
| DE | 44 42 539 A1 | 6/1996 |
| DE | 197 51 642 A1 | 5/1999 |
| DE | 299 09 205 U1 | 11/2000 |
| DE | 100 13 938 C1 | 12/2001 |
| DE | 203 17 678 U1 | 3/2004 |

* cited by examiner

*Primary Examiner*—Angel R. Estrada
(74) *Attorney, Agent, or Firm*—Lawrence E. Laubscher, Sr.; Lawrence E. Laubscher, Jr.

(57) ABSTRACT

An electrical distribution box includes a housing having a front wall containing an opening surrounded by a flange portion, a plurality of side and end walls cooperating with the front wall to define a chamber communicating with the front wall opening, and a lid connected with the front wall for movement between open and closed positions relative to the opening, characterized in that at least a first one of the side and bottom walls is contained in a plane that is angularly arranged at an acute angle relative to the plane of the front wall, the angularly arranged first wall containing an opening in which an electrical component is mounted.

8 Claims, 5 Drawing Sheets

ELECTRICAL DISTRIBUTION BOX

BACKGROUND OF THE INVENTION

1. Field of the Invention

An electrical distribution box is provided including a housing having a front wall containing an opening surrounded by a flange portion, a plurality of side and end walls cooperating with the front wall to define a chamber communicating with the front wall opening, and a lid connected with the front wall for movement between open and closed positions relative to the opening, characterized in that at least a first one of the side and bottom walls is contained in a plane that is angularly arranged at an acute angle relative to the plane of the front wall, the angularly arranged first wall containing an opening in which an electrical component is mounted.

2. Description of the Related Art

It is well known in the electrical distribution panel art to provide doors, covers or lids for protecting and closing the access openings leading to the chambers contained therein.

There continues to be a need in the art for a distribution box that is inexpensive, sturdy, and compact, and which affords high protection and positive support for the electrical components mounted therein.

BRIEF SUMMARY OF THE INVENTION

Accordingly, the present invention was developed to provide and improved electrical distribution box having a front wall containing an opening, a plurality of side and bottom walls cooperating with the front wall to define a chamber in communication with said opening, the plane containing at least a first one of the side and bottom walls being arranged at an acute angle relative to the plane containing the front wall, and an electrical component, such as a plug or socket, mounted in an opening contained in the angularly arranged wall.

The oblique arrangement of the angularly arranged walls makes it possible to keep the structural depth with relation to the plane of the housing front wall rather small, while, nevertheless, one can also house bulky plug parts or miscellaneous devices. The front wall includes a flange portion that extends around the opening in a simple manner, thereby facilitating a sealed structural shape and creating the prerequisite for providing a high protection category for the components mounted therein (for example, IP 65). In a preferable manner, the chamber is designed to receive a memory component by way of an oblique arrangement on one of the walls that are aligned at an acute angle with respect to the plane of the front wall.

Preferably, the angularly arranged walls through which the plug part and/or the socket part pass are arranged at an angle of between 30° and 60° with respect to the plane of the front wall, thereby to achieve a particularly compact and stable design. Here it is possible directly to integrate into the walls also coupling parts of the most varied kind, in particular, RJ45 or USB coupling parts.

Regarding the design of a particularly high grade of protection, one must especially also mention as advantageous the preferred provision of a continuous sealing ring in a continuous groove in the flange or the lid part around the front wall opening, thereby to seal the area between the flange segment and the lid part.

BRIEF DESCRIPTION OF THE DRAWINGS

Other objects and advantages of the invention will become apparent from a study of the following specification when viewed in the light of the accompanying drawings, in which.

DETAILED DESCRIPTION OF THE INVENTION

Figure 1:
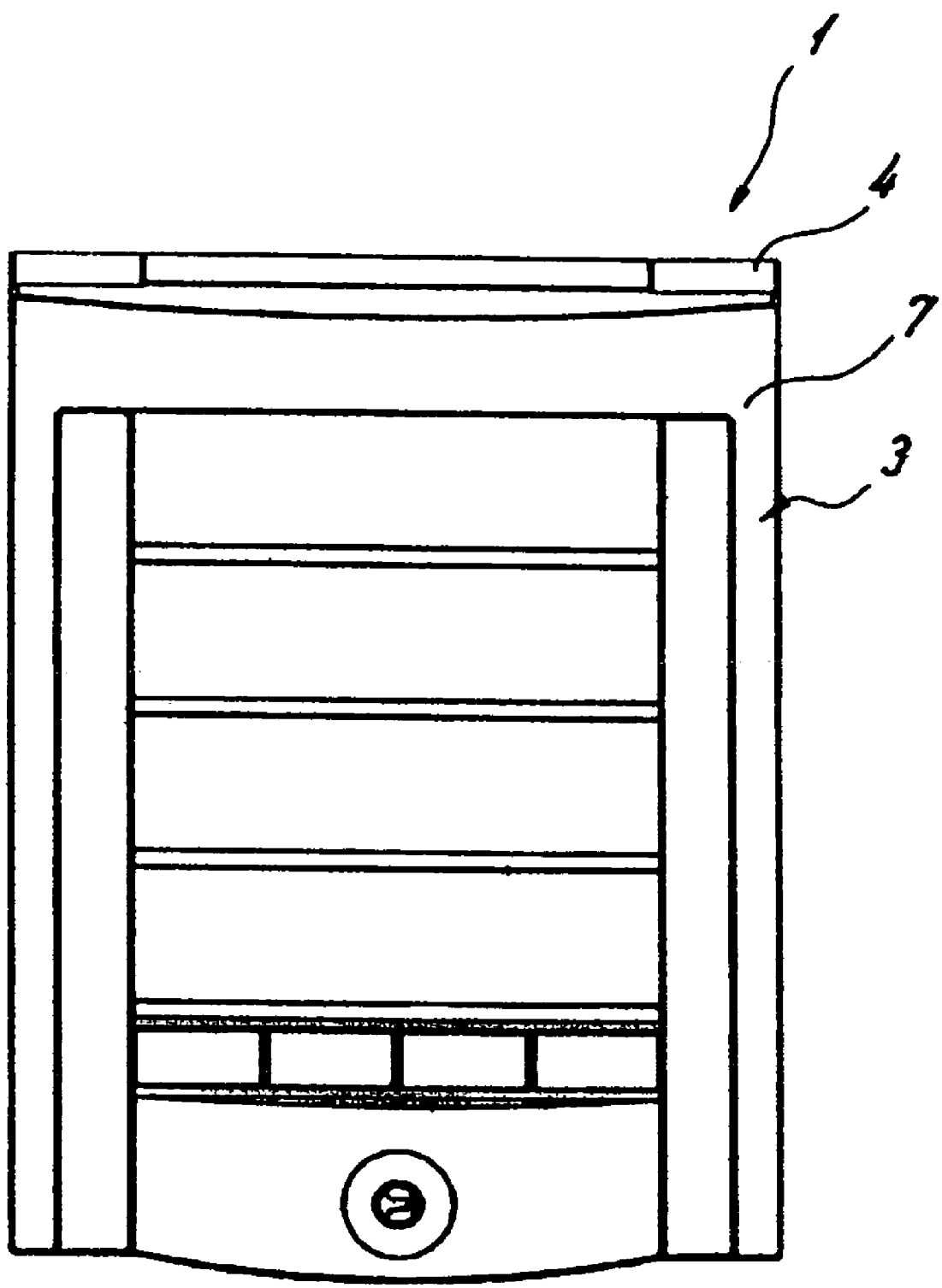
FIG. 1 is a front elevation view of the electrical distribution box of the present invention.
Figure 2:
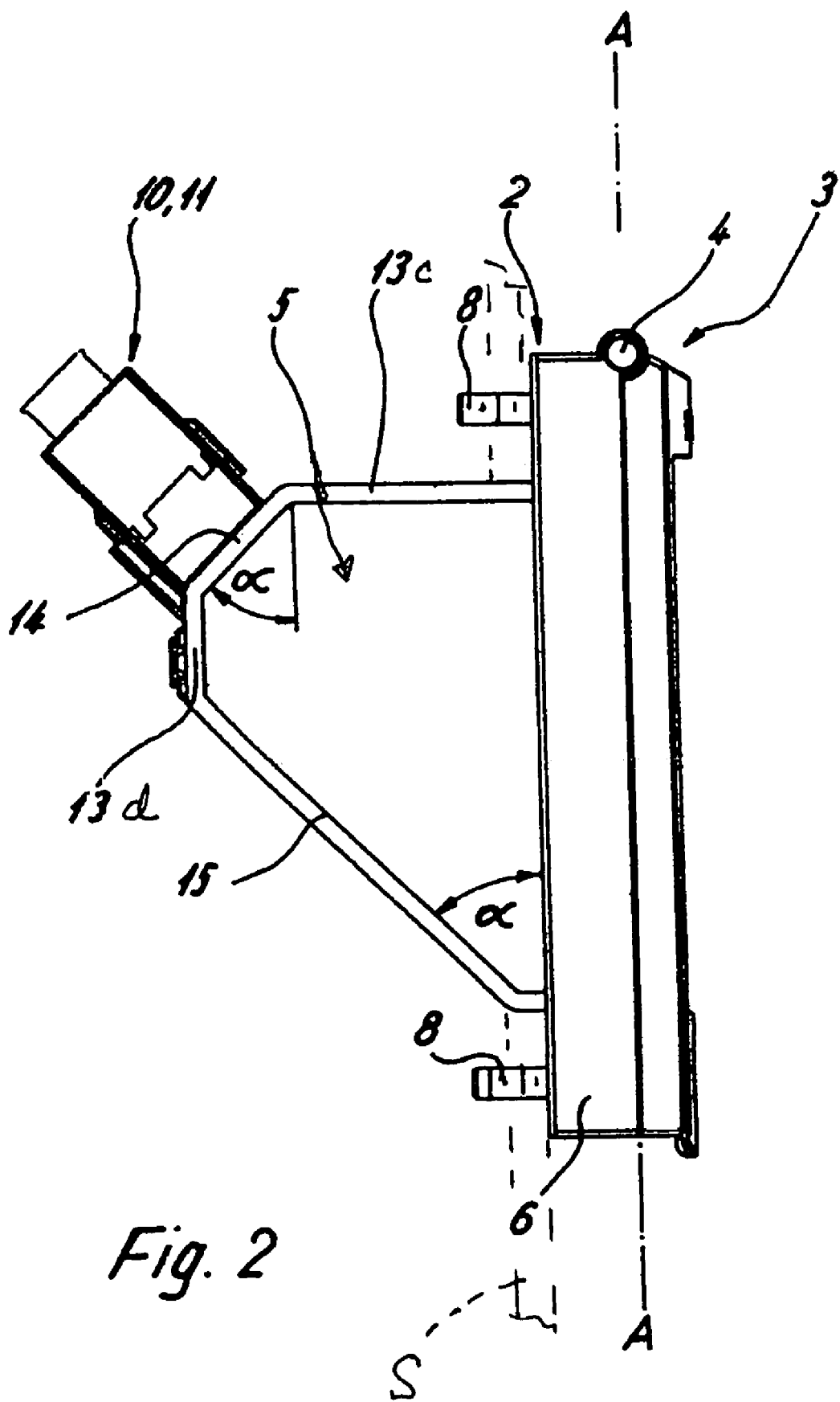
FIGS. 2 and 3 are partly sectioned and sectional views, respectively, of the distribution box taken along a plane normal to the plane of FIG. 1.
Figure 3:
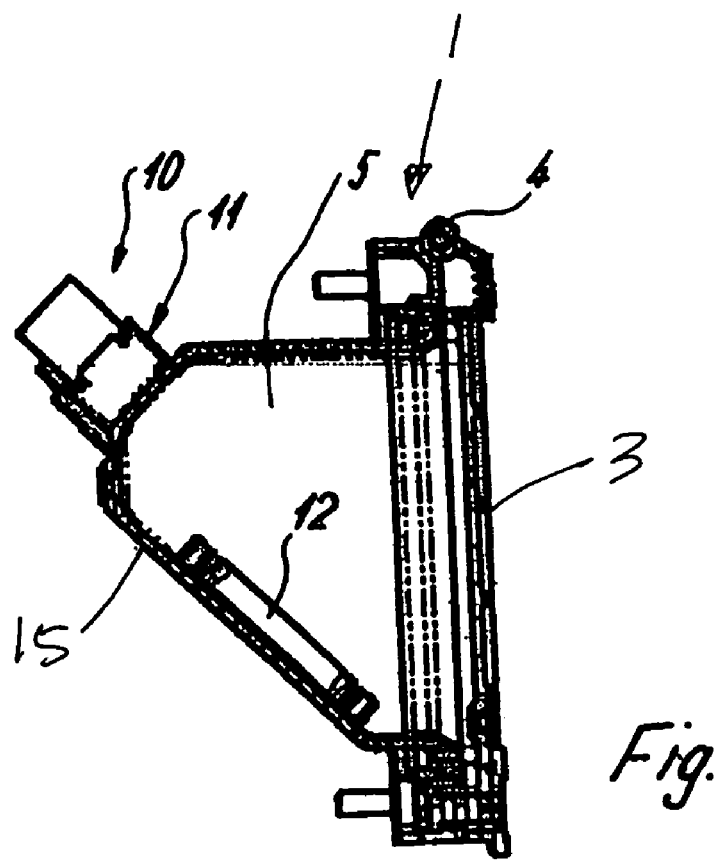
Figure 4:
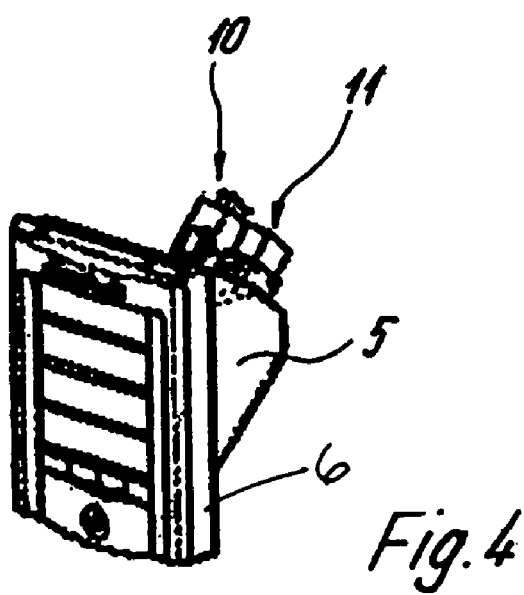
FIG. 4 is a detailed front perspective view of the distribution box.
Figure 5:
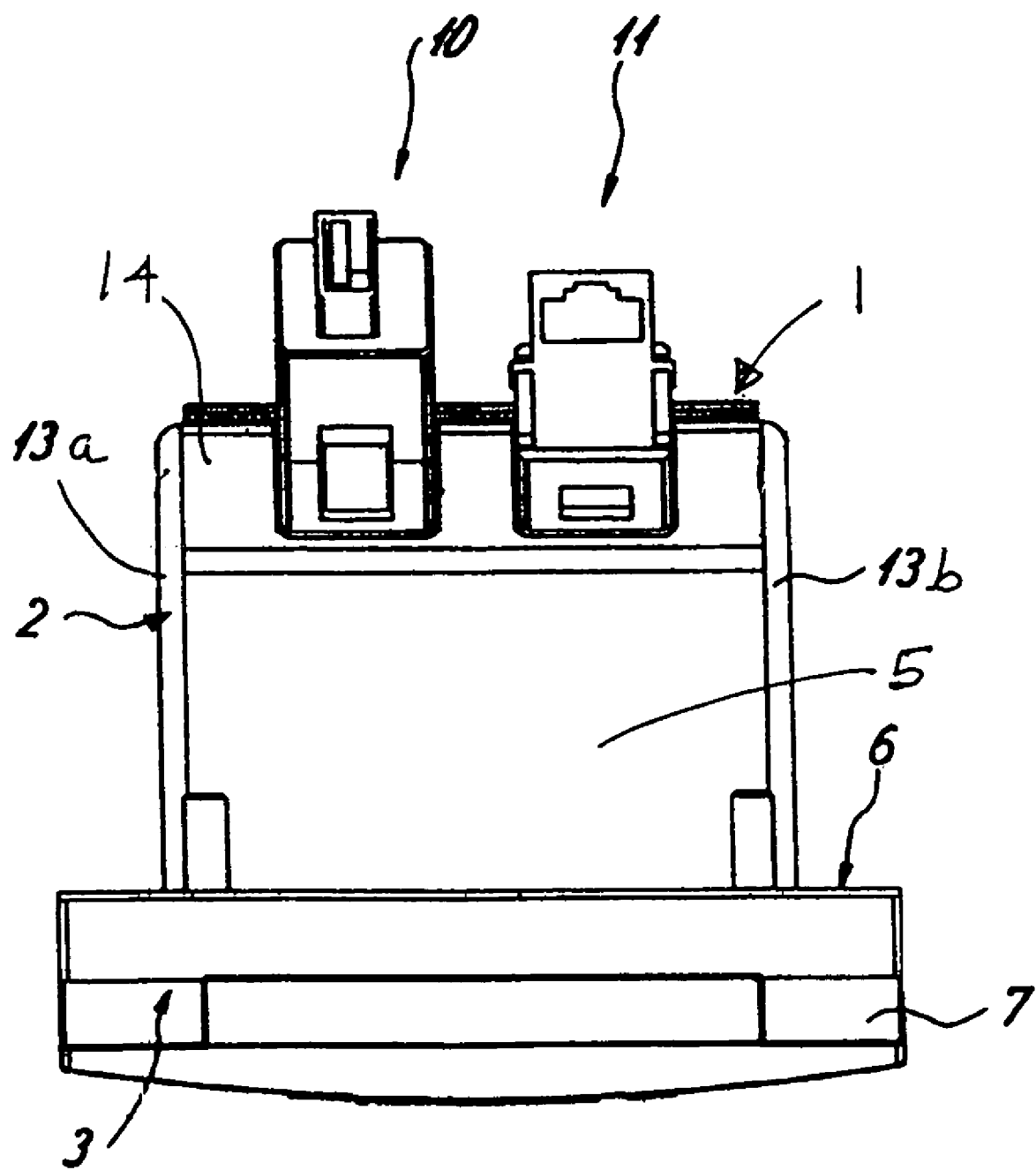
FIG. 5 is a top view of the distribution box of FIGS. 1 and 2.
Figure 6:
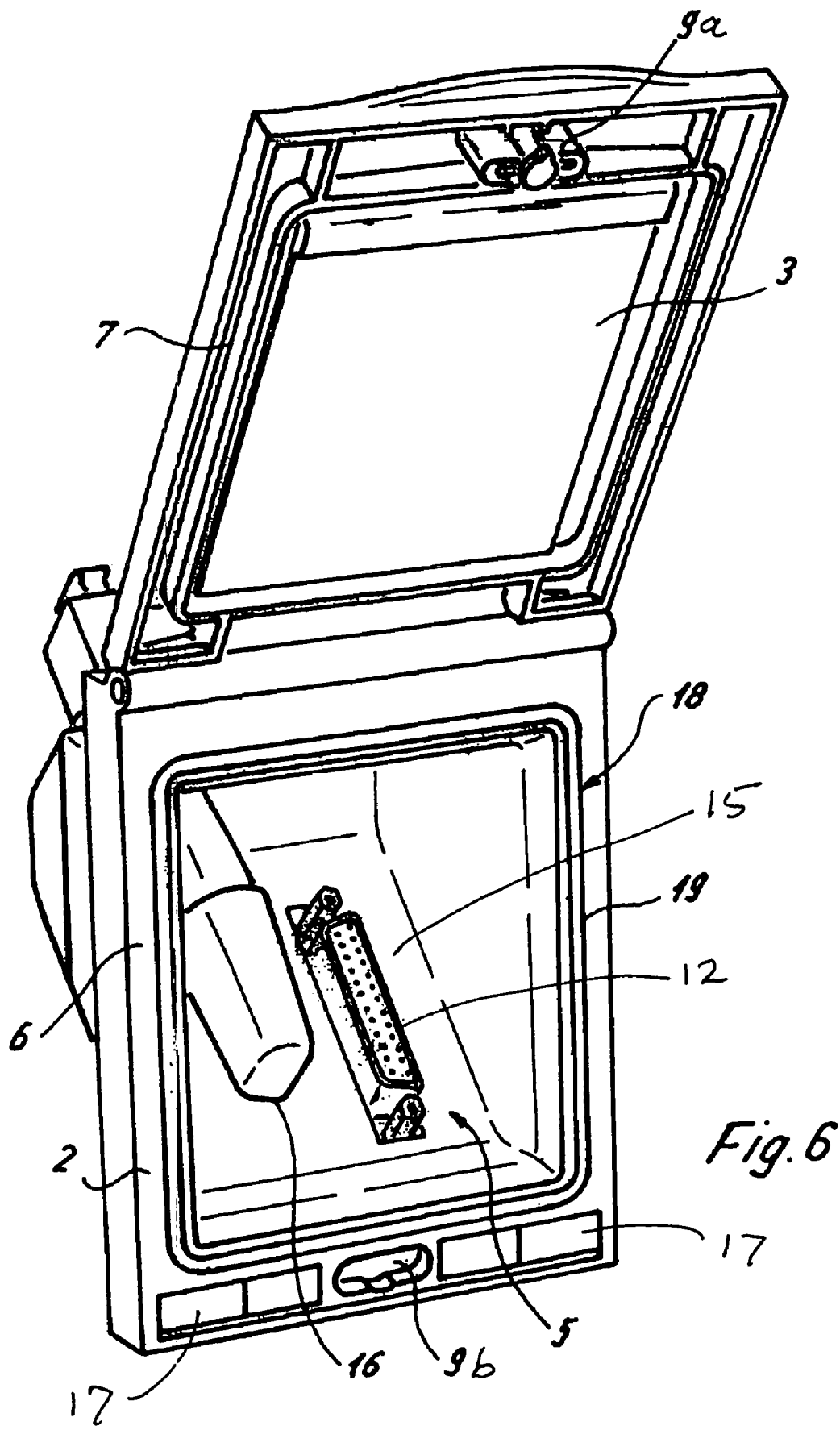
FIG. 6 is front perspective view of the electrical distribution box with the lid in its open position.

Referring first to FIGS. 1–3, the electrical distribution box 1 includes a front wall 2 containing an opening that communicates with a chamber 5 defined by side and bottom walls 13a, 13b, 13c, 13d, 14 and 15. Surrounding the front wall opening is a flange portion 6, as best shown in FIG. 6. Pivotally connected with the front wall flange portion 6 by hinge means 4 is a protective lid 3, which lid is pivotally displaceable between the closed position of FIGS. 1–5 and the open position of FIG. 6.

In order to seal the chamber opening, the flange portion 6 contains a continuous groove 18 (FIG. 6) that surrounds the chamber opening and in which is mounted the continuous resilient seal 19 that is formed from a suitable compressible synthetic plastic material. The seal 19 is so designed that it is compressed to a sealing condition by the lid 3 when the lid is pivoted toward its closed position of FIG. 2. At its rear surface, the front wall 2 is provided with rearwardly extending bolts 8 for fastening the distribution box within an opening contained in a fixed support S, such as the door of an electrical panel. The lid 3 is provided with a lock 9a that cooperates with a locking opening 9b contained in the front wall flange portion 6, thereby to lock the lid in the closed position against unauthorized opening.

In accordance with the present invention, at least some of the housing bottom and side walls are angularly arranged relative to the plane A—A containing the front wall 2. In the illustrated embodiment, this plane A—A is generally vertical. As best shown in FIGS. 2 and 5, the side walls 13a, 13b and 13c are normal to the plane A—A containing the front wall 2, and the bottom wall 13d is parallel to the plane A—A. The housing includes also a first angular wall 14 that is angularly arranged at an acute angle $\alpha$ relative to the front wall plane A—A, which angular wall contains openings in which are mounted the electrical sockets or plugs 10 and 11, as best shown in FIG. 5. Similarly, a second angular wall 15 is arranged at the same acute angle $\alpha$ relative to the plane A—A, which second angular wall contains an opening for receiving the electrical socket 12, as shown in FIGS. 3 and 6. Thus, as shown in FIGS. 2, 3 and 6, the front and bottom walls 2 and 13d are vertical, and the angularly arranged top and bottom side walls 14 and 15 are each arranged at an obtuse angle relative to the bottom wall 13d.

Due to the "obliquely" arranged angular walls 14, 15, electrical plugs, sockets or connection adaptors such as memory components 16 (FIG. 6) can be housed in the chamber 5 in a compact space-saving manner, although the maximum depth with relation to the flange portion 6 need not correspond with the depth of the plug or socket parts or of the memory component 16.

The distribution box housing 1 makes it possible—even without opening a circuit breaker cabinet or the wall in which is inserted the distribution box housing 1—to connect to the plug or socket parts 10–12 counterplug or socket parts or other devices such as the illustrated memory components 16 and thus to perform programming, tests and the like of a control unit that is integrated into the switching cabinet or the machine.

A special advantage provided by the invention is that the distribution box housing can be made in a sealed design in a simple and reasonably priced manner, and one can also comply with the regulations for the higher protection categories such as IP67.

The distributor box housing preferably consists of a solid or sturdy synthetic plastic material, whereby, in particular, the lid part can also be made in a transparent manner in order to provide a clear view of the interior of the interface housing without having to open it.

The most varied plug parts can be attached upon angular walls 14, 15 that are arranged at acute angles such as multipole plugs of the most varied design such as USB, RJ45, RS232, Centronics and other interfaces. According to FIG. 1, the conducting elements or metal parts of the plug or socket parts via Standard RJ 45 and USB are directly integrated into one of the walls 14, 15 and are surrounded by plastic substance in a sealed manner.

Finally, several marking indicia fields 17 are made in flange segment 6 for the simple attachment of markers and the like.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. An electrical distribution box, comprising:
   (a) a housing including:
      (1) a front wall containing an opening, said front wall having a flange portion surrounding said opening, said front wall being contained in a first plane; and
      (2) a plurality of side and bottom walls connected with said front wall to define a chamber communicating with said opening, at least two of said side and bottom walls each being an angularly ranged wall contained in a second plane that is angularly arranged at an acute angle between 30° and 60° relative to said first plane;
   (b) a (3) connected with said front wall flange portion for movement between open and closed positions relative to said opening;
   (c) at least one electrical component mounted in an opening contained in one of said angularly arranged walls; and
   (d) a memory component mounted in an opening contained in one of said angularly arranged walls and extending at one end into said chamber.

2. An electrical distribution box as defined in claim 1, wherein said electrical component and said memory component are mounted on different ones of said angularly inclined walls.

3. An electrical distribution box as defined in claim 1, wherein said electrical component is selected from the group consisting of an RJ45 component and a USB standard component.

4. An electrical distribution box as defined in claim 1, wherein said flange portion contains a continuous groove surrounding said opening; and further including:
   (e) a continuous resilient seal member mounted in said groove for cooperation with said lid to seal said opening when said lid is in said closed position.

5. An electrical distribution box as defined in claim 1, and further including means for fastening said housing within an opening contained in a fixed support.

6. An electrical distribution box as defined in claim 1, and further including lock means for locking said lid to said front wall flange portion.

7. An electrical distribution box as defined in claim 1, wherein at least a portion of said lid that is opposite said front wall opening is transparent.

8. An electrical distribution box as defined in claim 2, wherein said housing bottom wall is parallel with said front wall, said front and bottom walls being vertical; wherein said angularly arranged walls comprise upper and lower side walls each arranged at an obtuse angle relative to said bottom wall; and further wherein said lid is connected with said front wall for pivotal movement about an horizontal pivot axis adjacent an upper portion of said front wall opening.

* * * * *